(12) United States Patent
Bales et al.

(10) Patent No.: US 12,039,491 B2
(45) Date of Patent: Jul. 16, 2024

(54) ITEM TRACKING WITH A WIRELESS COMMUNICATION SYSTEM BASED ON A FIFTH GENERATION IDENTIFIER (5GID) AND A GLOBAL TRACKING ITEM NUMBER (GTIN)

(71) Applicant: T-Mobile Innovations LLC, Overland Park, KS (US)

(72) Inventors: Mark Richard Bales, Lee's Summit, MO (US); Lyle T. Bertz, Lee's Summit, MO (US); Robert Keith Butler, Overland Park, KS (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 348 days.

(21) Appl. No.: 17/665,952

(22) Filed: Feb. 7, 2022

(65) Prior Publication Data
US 2023/0252405 A1   Aug. 10, 2023

(51) Int. Cl.
*G06Q 10/0833* (2023.01)
*G06Q 10/087* (2023.01)
*H04L 9/32* (2006.01)
*H04L 9/00* (2022.01)

(52) U.S. Cl.
CPC ....... *G06Q 10/087* (2013.01); *G06Q 10/0833* (2013.01); *H04L 9/3239* (2013.01); *H04L 9/50* (2022.05); *H04L 2209/56* (2013.01)

(58) Field of Classification Search
CPC .. G06Q 10/087; G06Q 10/0833; G06Q 10/30; H04L 9/3239; H04L 9/50; H04L 2209/56; H04L 2209/80
See application file for complete search history.

(56) References Cited

U.S. PATENT DOCUMENTS

| | | | |
|---|---|---|---|
| 8,249,927 | B2 | 8/2012 | Sahai |
| 8,528,817 | B2 | 9/2013 | Snyder et al. |
| 9,443,407 | B2 | 9/2016 | Davidson |
| 10,362,179 | B2 | 7/2019 | Harris |
| 10,817,574 | B2 | 10/2020 | Rothschild |
| 2016/0021049 | A1 | 1/2016 | Virtanen et al. |
| 2017/0289781 | A1 | 10/2017 | Ojala et al. |
| 2018/0225675 | A1 | 8/2018 | Rosenberg |

*Primary Examiner* — Brian F Shaw

(57) ABSTRACT

A wireless communication system tracks an item that wirelessly transfers a Fifth Generation Identifier (5GID) and a Global Trade Item Number (GTIN). Transceivers wirelessly detect the 5GID and the GTIN and transfer messages indicating the 5GID and the GTIN to a ledger gateway. The ledger gateway receives the messages and selects a distributed application in a distributed ledger node based on the 5GID and/or the GTIN. The ledger gateway proposes an item-tracking transaction with the 5GID and the GTIN to the selected distributed application in the distributed ledger node. The distributed ledger node and distributed application execute the proposed item-tracking transaction with the 5GID and the GTIN to generate an item-tracking result and store the item-tracking result in a blockchain format.

20 Claims, 8 Drawing Sheets

ITEM TRACKING WITH A WIRELESS
COMMUNICATION SYSTEM BASED ON A
FIFTH GENERATION IDENTIFIER (5GID)
AND A GLOBAL TRACKING ITEM NUMBER
(GTIN)

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), Bluetooth Low Energy (BLE), Low-Power Wide Area Network (LP-WAN), Internet-of-Things (IoT), Near Field Communications (NFC), and the like. The wireless access nodes exchange network signaling and user data with network elements that are often clustered together into wireless network cores. The wireless network elements comprise Access and Mobility Management Functions (AMFs), User Plane Functions (UPFs), and the like.

Electromagnetic power harvesting microprocessors have wireless receivers that wirelessly receive ambient wireless signals and store the energy from these signals in capacitors for subsequent use. The microprocessors may be embedded in another product and use their harvested energy to wirelessly broadcast an identifier or code for the product. One example of a product code is the Global Trade Item Number (GTIN) that is indicated by a bar-code on many products. The GTIN is linked to data like product name and price.

Distributed ledgers execute data transactions and store transaction results in a blockchain format. The blockchain format uses multiple geo-diverse nodes that store redundant data blocks. Each data block includes a hash of the previous data block. The multiple geo-diverse nodes and the previous block hashes make the ledger data immutable. Unfortunately, the wireless communication networks have not effectively integrated electromagnetic power harvesting microprocessors with distributed ledgers. Moreover, wireless communication networks do not efficiently track integrated electromagnetic power harvesting microprocessors by using distributed ledgers.

TECHNICAL OVERVIEW

A wireless communication system tracks an item that wirelessly transfers a Fifth Generation Identifier (5GID) and a Global Trade Item Number (GTIN). Transceivers wirelessly detect the 5GID and the GTIN and transfer messages indicating the 5GID and the GTIN to a ledger gateway. The ledger gateway receives the messages and selects a distributed application in a distributed ledger node based on the 5GID and/or the GTIN. The ledger gateway proposes an item-tracking transaction with the 5GID and the GTIN to the selected distributed application in the distributed ledger node. The distributed ledger node and distributed application execute the proposed item-tracking transaction with the 5GID and the GTIN to generate an item-tracking result and store the item-tracking result in a blockchain format.

DETAILED DESCRIPTION

Figure 1:
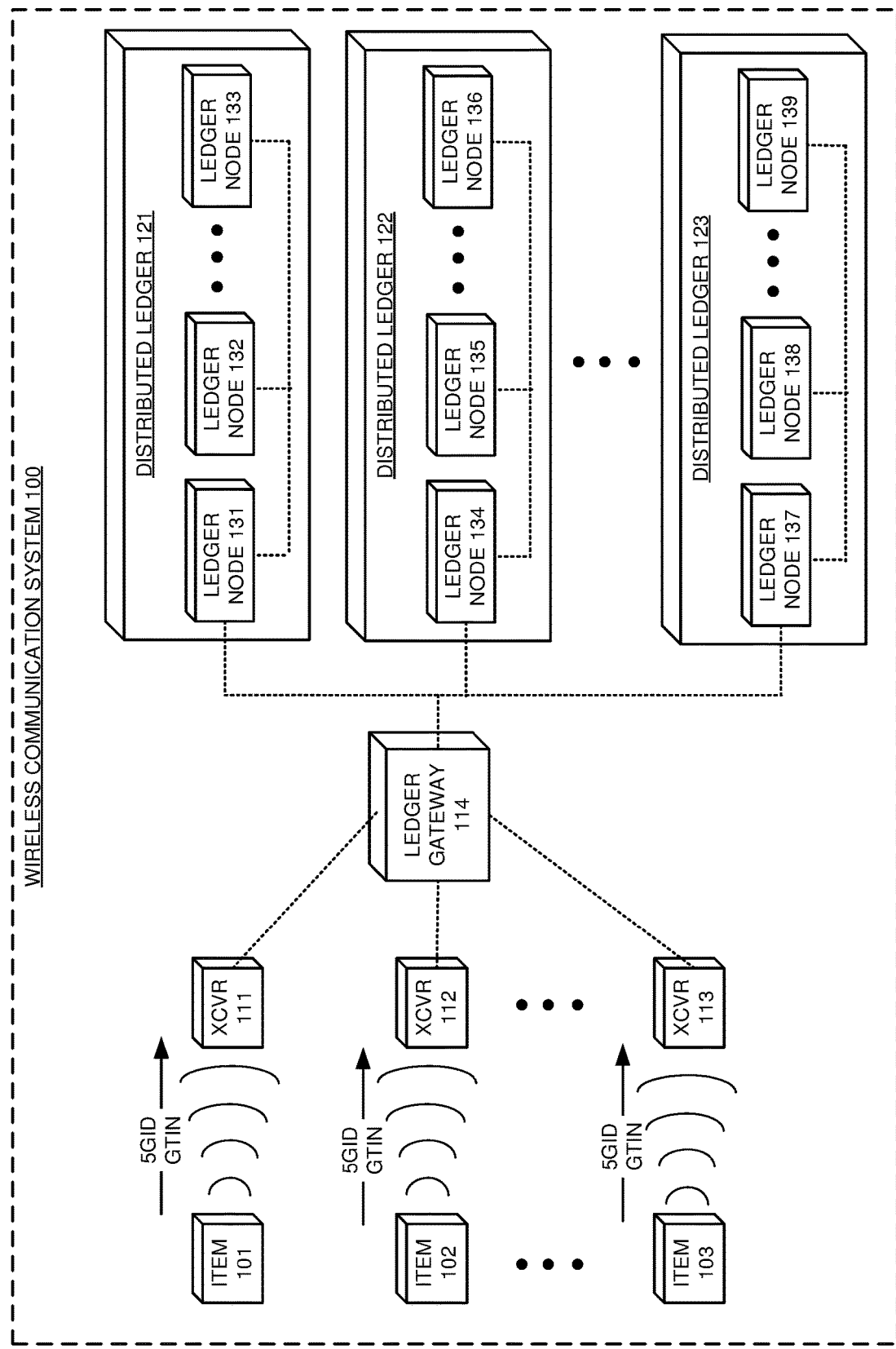
FIG. 1 illustrates an exemplary wireless communication system to track an item that wirelessly transfers a Fifth Generation Identifier (5GID) and a Global Trade Item Number (GTIN).

FIG. 1 illustrates exemplary wireless communication system 100 to track items 101-103 that wirelessly transfer Fifth Generation Identifier (5GIDs) and a Global Trade Item Numbers (GTINs). Wireless communication system 100 comprises items 101-103, transceivers (XCVRs) 111-113, ledger gateway (GW) 114, and distributed ledgers 121-123. Distributed ledger 121 comprises ledger nodes 131-133. Distributed ledger 122 comprises ledger nodes 134-136. Distributed ledger 123 comprises ledger nodes 137-139. Items 101-103 comprise food and beverage products, tools and machines, and/or some other consumer good. In some examples, items 101-103 comprise recyclable containers like plastic bottles. Items 101-103 wirelessly transfer their own 5GIDs and GTINs. The 5GIDs individually identify each one of items 101-103 with their own unique and secret data string. The GTINs identify items 101-103 using the standard GS-1 product characterization methodology. In some examples, items 101-103 have ambient electromagnetic power harvesting microprocessors that whisper their 5GIDs and GTINs. In some examples, the 5GID and GTIN pairings are cross-checked for accuracy before their binding in items 101-103.

Various examples of network operation and configuration are described herein. In some examples, transceiver 111 wirelessly detects the 5GID and the GTIN from item 101, and in response, transceiver 111 transfers a message to ledger gateway 114 that indicates the detection of the 5GID and the GTIN for item 101. Ledger gateway 114 receives the message indicating the 5GID and the GTIN detection for item 101, and in response, ledger gateway selects a Distributed Application (dAPP) in one of ledger nodes 131, 134, and 137 based on at least one of the 5GID and the GTIN for item 101. In this example, ledger gateway 114 selects dAPP A in ledger node 131. Ledger gateway 114 proposes an item-tracking transaction with the 5GID and the GTIN for item 101 to selected dAPP A in selected ledger node 131.

Ledger nodes 131-133 execute dAPP A, and in response, dAPP A executes the proposed item-tracking transaction with the 5GID and the GTIN for item 101. Ledger nodes 131-133 execute dAPP A to generate an item-tracking result based on the proposed item-tracking transaction. Ledger nodes 131-133 execute dAPP A to store the item-tracking result in a blockchain format.

Transceiver 112 wirelessly detects the 5GID and the GTIN from item 102, and in response, transceiver 112 transfers a message to ledger gateway 114 that indicates the detection of the 5GID and the GTIN for item 102. Ledger gateway 114 receives the message indicating the 5GID and the GTIN detection for item 102, and in response, ledger gateway 114 selects dAPP B in ledger node 134 based on at least one of the 5GID and the GTIN for item 102. Ledger gateway 114 proposes an item-tracking transaction with the 5GID and the GTIN for item 102 to selected dAPP B in selected ledger node 134. Ledger nodes 134-136 execute dAPP B, and in response, dAPP B executes the proposed item-tracking transaction with the 5GID and the GTIN for item 102. Ledger nodes 134-136 execute dAPP B to generate an item-tracking result based on the proposed item-tracking transaction. Ledger nodes 134-136 executed dAPP B to store the item-tracking result in a blockchain format.

Transceiver 113 wirelessly detects the 5GID and the GTIN from item 103, and in response, transceiver 113 transfers a message to ledger gateway 114 that indicates the detection of the 5GID and the GTIN for item 103. Ledger gateway 114 receives the message indicating the 5GID and the GTIN detection for item 103, and in response, ledger gateway 114 selects dAPP B in ledger node 134 and dAPP C in ledger node 137 based on at least one of the 5GID and the GTIN for item 103. Ledger gateway 114 proposes an item-tracking transaction with the 5GID and the GTIN for item 103 to selected dAPP B in selected ledger node 134. Ledger nodes 134-136 execute dAPP B, and in response, dAPP B executes the proposed item-tracking transaction with the 5GID and the GTIN for item 103. Ledger nodes 134-136 execute dAPP B to generate an item-tracking result based on the proposed item-tracking transaction. Ledger nodes 134-136 execute dAPP B to store their item-tracking result in a blockchain format. Ledger gateway 114 also proposes an item-tracking transaction with the 5GID and the GTIN for item 103 to selected dAPP C in selected ledger node 137. Ledger nodes 137-139 execute dAPP C, and in response, dAPP C executes the proposed item-tracking transaction with the 5GID and the GTIN for item 103. Ledger nodes 137-139 execute dAPP C to generate an item-tracking result based on the proposed item-tracking transaction. Ledger nodes 137-139 executed dAPP C to store their item-tracking result in a blockchain format.

In some examples, items 101-103 wirelessly transmit their 5GID and GTIN upon manufacture, and one of transceivers 111-113 that is located at the manufacturing site wirelessly receives the 5GIDs and GTINs. The transceiver transfers the 5GIDs and GTINs associated with the manufacturing event to the proper dAPP over ledger gateway 114. In some examples, ledger gateway 114 identifies a wireless network slice that serves the correct dAPP in the correct distributed ledger node based on the 5GID and/or the GTIN. In some examples, ledger gateway 114 transfers the 5GID and/or the GTIN to a Unified Data Management (UDM) and receives a response from the UDM that indicates the selected dAPP in the selected distributed ledger node. In some examples, ledger gateway 114 transfers the 5GID and/or the GTIN to an Unstructured Data Storage Function (UDSF) and receives a response from the UDSF that indicates the selected dAPP in the selected distributed ledger node. The item-tracking result may comprise generating: 1) origin data that characterizes a binding of the 5GID and the GTIN to the item, 2) shipping data that characterizes the arrival of the item at a geographic location, 3) shipping data that characterizes the departure of the item from the geographic location, 4) recycling data that characterizes an item redemption at a recycling center, 5) a recycling credit for the item, 6) an index entry for an item index that correlates the item to its stored item-tracking results, and/or 7) some other product status data.

Advantageously, wireless communication system 100 effectively integrates items 101-103 that have electromagnetic power harvesting microprocessors with distributed ledgers 121-123. Moreover, wireless communication system 100 efficiently tracks items 101-103 that have electromagnetic power harvesting microprocessors by using distributed ledgers 121-123.

Items 101-103 and transceivers 111-113 wirelessly communicate using a low-power wireless protocol like Institute of Electrical and Electronic Engineers (IEEE) 802.11 (WIFI), Bluetooth Low Energy (BLE), Internet-of-Things (IoT), Radio Frequency Identification (RFID), Near Field Communications (NFC), Low-Power Wide Area Network (LP-WAN), or the like. Transceivers 111-113, ledger gateway 114, and ledgers 121-123 communicate over network connections that comprise metallic wiring, glass fibers, radio channels, or some other communication media. The network connections may use Fifth Generation New Radio (5GNR), Long Term Evolution (LTE), WIFI, LP-WAN, IEEE 802.3 (ETHERNET), Internet Protocol (IP), Time Division Multiplex (TDM), Data Over Cable System Interface Specification (DOCSIS), Synchronous Optical Network (SONET), virtual switching, inter-processor communication, bus interfaces, and/or some other data communication protocols. Transceivers 111-113, ledger gateway 114, and distributed ledgers 121-123 comprise microprocessors, software, memories, transceivers, radios, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, radio applications, and network applications. The microprocessors retrieve the software from the memories and execute the software to drive the operation of wireless communication system 100 as described herein.

Figure 2:
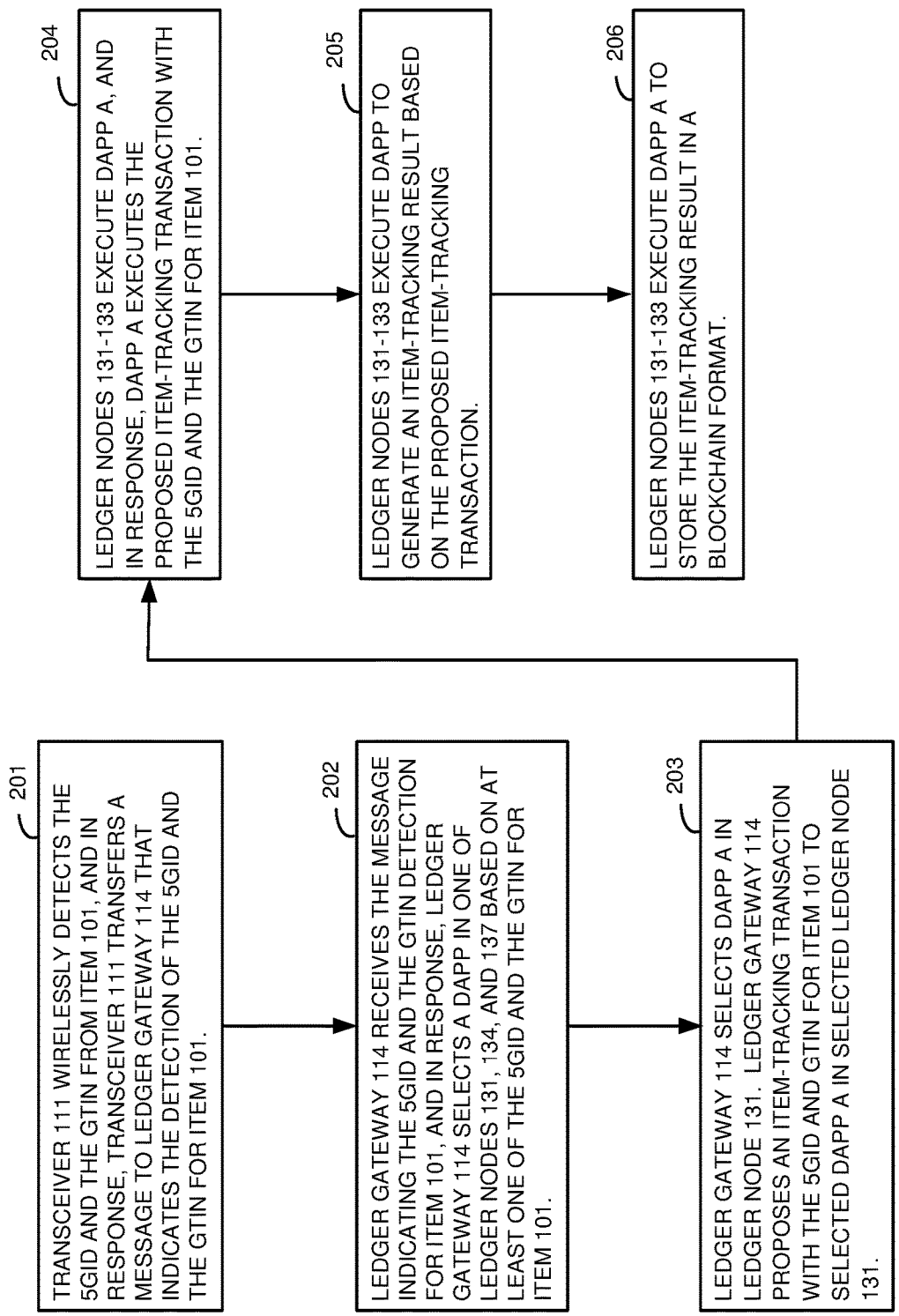
FIG. 2 illustrates an exemplary operation of the wireless communication system to track the item that wirelessly transfers the 5GID and the GTIN.

FIG. 2 illustrates an exemplary operation of wireless communication system 100 to track item 101 that wirelessly transfers its 5GID and GTIN. The operation may vary in other examples. Transceiver 111 wirelessly detects the 5GID and the GTIN from item 101, and in response, transceiver 111 transfers a message to ledger gateway 114 that indicates the detection of the 5GID and the GTIN for item 101 (201). Ledger gateway 114 receives the message indicating the 5GID and the GTIN detection for item 101, and in response, ledger gateway 114 selects a dAPP in one of ledger nodes 131, 134, and 137 based on at least one of the 5GID and the GTIN for item 101 (202). In this example, ledger gateway 114 selects dAPP A in ledger node 131. Ledger gateway 114 proposes an item-tracking transaction with the 5GID and GTIN for item 101 to selected dAPP A in selected ledger node 131 (203). Ledger nodes 131-133 execute dAPP A, and in response, dAPP A executes the proposed item-tracking transaction with the 5GID and the GTIN for item 101 (204). Ledger nodes 131-133 execute dAPP to generate an item-tracking result based on the proposed item-tracking transaction (205). Ledger nodes 131-133 execute dAPP A to store the item-tracking result in a blockchain format (206).

Figure 3:
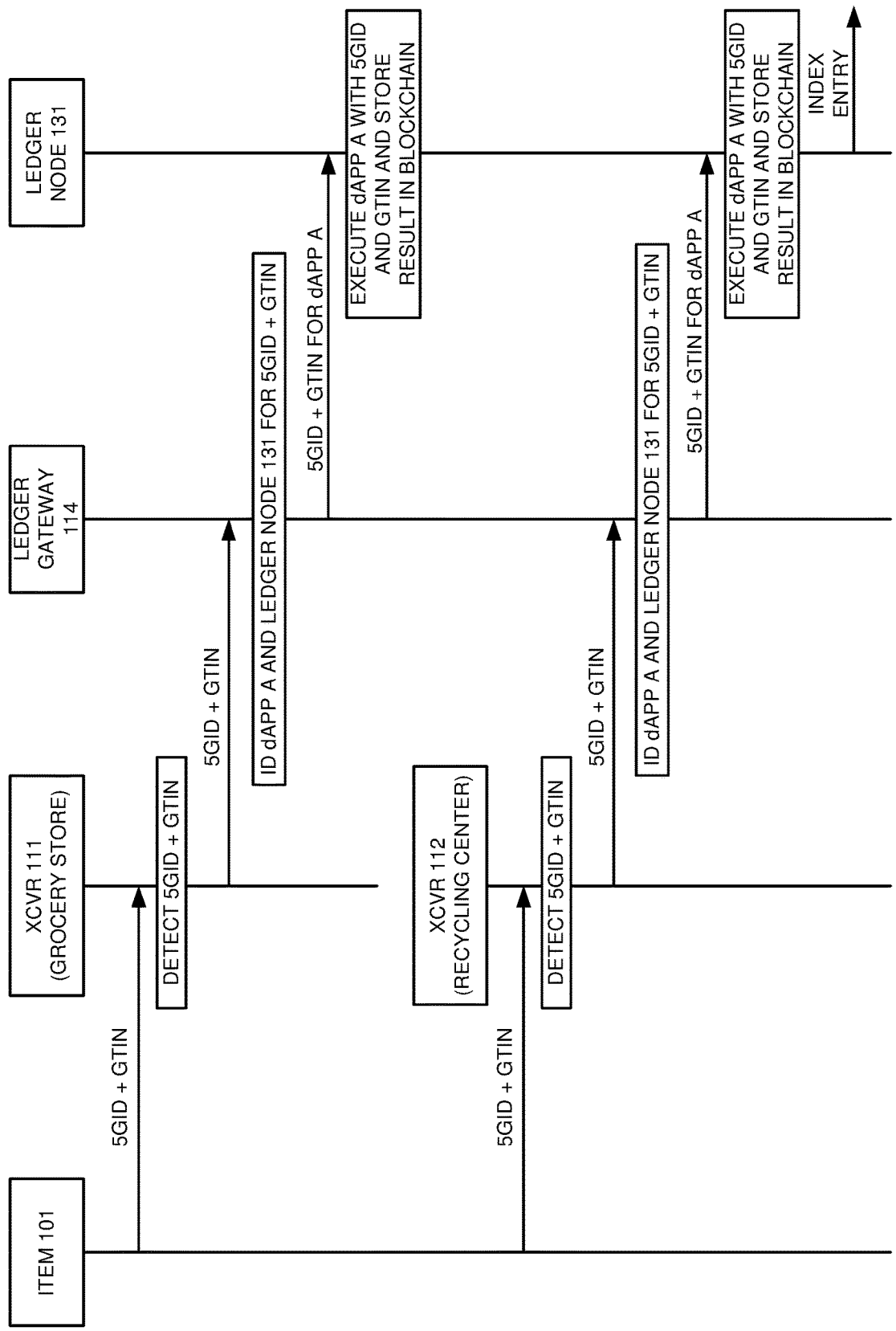
FIG. 3 illustrates an exemplary operation of the wireless communication system to track the item that wirelessly transfers the 5GID and the GTIN.

FIG. 3 illustrates an exemplary operation of wireless communication system 100 to track item 101 that wirelessly transfers its 5GID and GTIN. The operation may vary in other examples. Item 101 is a plastic bottle of water in this example and is shipped to a grocery store. Item 101 wirelessly transmits its 5GID and GTIN. Transceiver 111 wirelessly detects the 5GID and the GTIN from item 101, and in response, transceiver 111 transfers a message to ledger gateway 114 that indicates the detection of the 5GID and the GTIN for item 101. Ledger gateway 114 receives the message indicating the 5GID and the GTIN detection for item 101, and in response, ledger gateway selects dAPP A in ledger nodes 131 based on the 5GID and the GTIN for item 101. Ledger gateway 114 proposes an item-tracking transaction with the 5GID and the GTIN for item 101 to selected dAPP A in selected ledger node 131. Ledger nodes 131-133 execute dAPP A, and in response, dAPP A executes the proposed item-tracking transaction with the 5GID and the GTIN for item 101. Ledger nodes 131-133 execute dAPP A to generate an item-tracking result based on the proposed item-tracking transaction. Ledger nodes 131-133 execute dAPP A to store the item-tracking result in a blockchain format. In this example, the item tracking-result characterizes the arrival of the plastic glass bottle at the grocery store.

Item 101 is eventually deposited with a recycling center and wirelessly transmits its 5GID and GTIN. Transceiver 112 wirelessly detects the 5GID and the GTIN from item 101, and in response, transceiver 112 transfers a message to ledger gateway 114 that indicates the detection of the 5GID and the GTIN for item 101. Ledger gateway 114 receives the message indicating the 5GID and the GTIN detection for item 101, and in response, ledger gateway 114 selects dAPP A in ledger node 131. Ledger gateway 114 proposes an item-tracking transaction with the 5GID and the GTIN for item 101 to selected dAPP A in selected ledger node 131. Ledger nodes 131-133 execute dAPP A, and in response, dAPP A executes the proposed item-tracking transaction with the 5GID and the GTIN for item 101. Ledger nodes 131-133 execute dAPP A to generate an item-tracking result based on the proposed item-tracking transaction. Ledger nodes 131-133 execute dAPP A to store the item-tracking result in a blockchain format. In this example, this item tracking-result characterizes the arrival of the glass bottle at the recycling center and also triggers the transfer of an index entry for item 101 to a searchable index.

Figure 4:
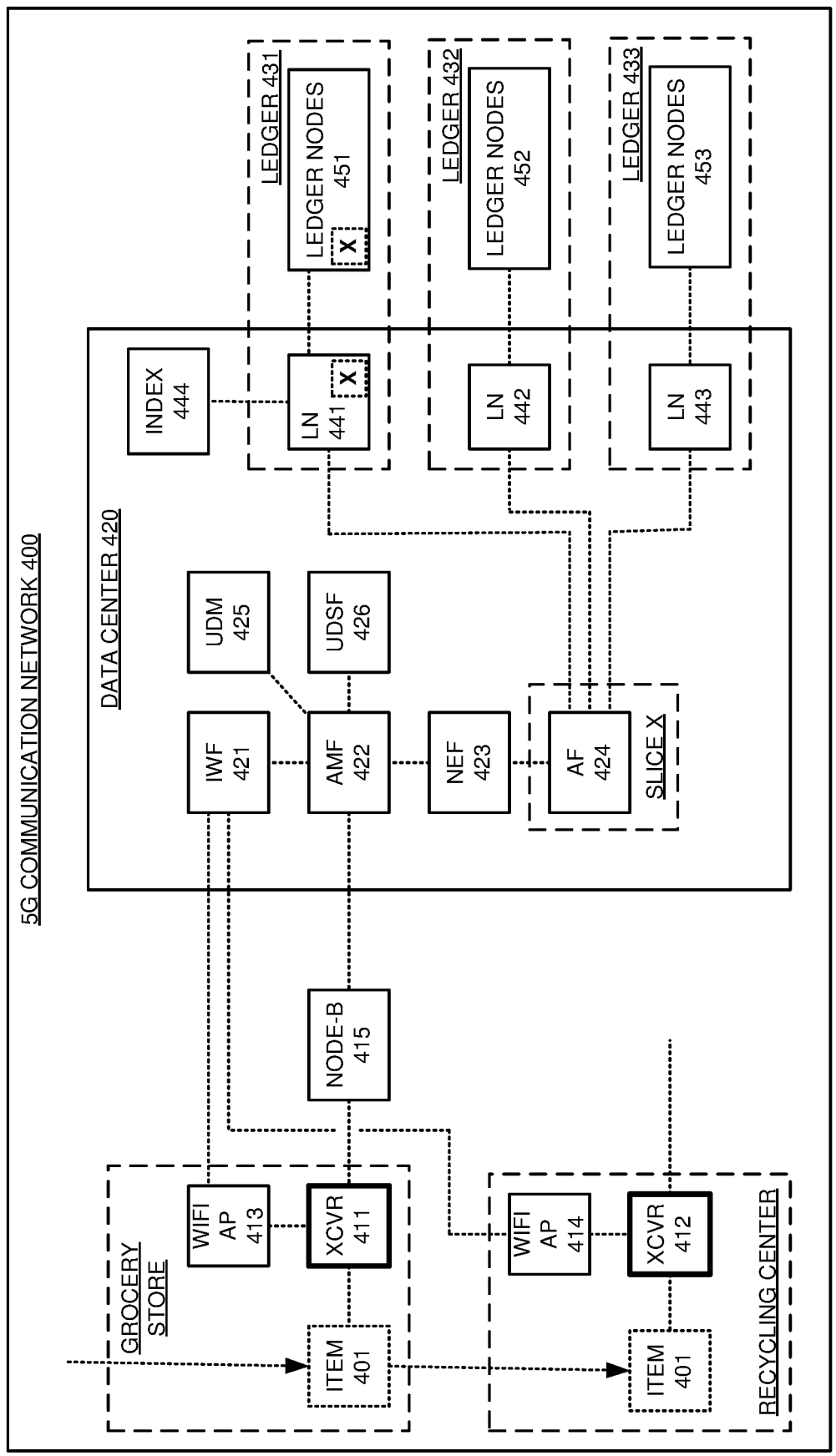
FIG. 4 illustrates an exemplary Fifth Generation (5G) communication network to track an item that wirelessly transfers a 5GID and a GTIN.

FIG. 4 illustrates an exemplary Fifth Generation (5G) communication network 400 to track item 401 that wirelessly transfers a 5GID and a GTIN. 5G communication network 400 comprises an example of wireless communication system 100, although system 100 may differ. 5G communication network 400 comprises: item 401, transceivers (XCVRs) 411-412, WIFI Access Points (APs) 413-414, NodeB 415, network data center 420, and ledger nodes 451-453. Network data center 420 comprises Interworking Function (IWF) 421, Access and Mobility Management Function (AMF) 422, Network Exposure Function (NEF) 423, Application Function (AF) 424, Unified Data Management (UDM) 425, and Unstructured Data Storage Function (UDSF) 426, Ledger Nodes (LNs) 441-443, and index 444. AF 424 comprises wireless network slice X. Distributed ledger 431 comprises LN 441 and ledger nodes 451. Distributed ledger 432 comprises LN 442 and ledger nodes 452. Distributed ledger 433 comprises LN 443 and ledger nodes 453.

A grocery store includes transceiver 411 and WIFI AP 413. A recycling center includes transceiver 412 and WIFI AP 414. Distributed ledgers 431-433 execute various dAPPs. LN 441 and ledger nodes 451 execute dAPP X which serves a grocery store recycling campaign for plastic bottles. Data center 420 is configured to serve Application Programming Interfaces (APIs) to transceivers 411-412 that effectively transfer 5GIDs and GTINs from items to dAPPs. In the is example, data center 420 is configured to serve an API to transceivers 411-412 that transfers the 5GID, GTIN, and associated metadata for item 401 (and other like items) to dAPP X in LN 441. The API uses slice X which comprises AF 424 that is linked to distributed ledgers 431-433. AF 424 is configured to route the 5GIDs, GTINs, and associated metadata for the various items to the correct dAPPs—and AF 424 routes the 5GID, GTIN, and associated metadata for item 401 to dAPP X in LN 441.

In the grocery store, transceiver 411 wirelessly attaches to WIFI AP 413 and registers with AMF 422 over AP 413 and IWF 421. Transceiver 411 may also wirelessly attach to 5GNR NodeB 415 and register with AMF 422 over NodeB 415. AMF 422 interacts with UDM 425 to authenticate transceiver 411 and establish an N1 signaling link. AMF 422 interacts with UDM 425 to authorize the N1 API for transceiver 411 to communicate over slice X with dAPP X in LNs 441 and 451. In the recycling center, transceiver 412 wirelessly attaches to WIFI AP 414 and registers with AMF 422 over AP 414 and IWF 421. Transceiver 412 may also wirelessly attach to 5GNR NodeB 415 and register with AMF 422 over NodeB 415. AMF 422 interacts with UDM 425 to authenticate transceiver 412 and establish an N1 signaling link. AMF 422 interacts with UDM 425 to authorize the N1 API for transceiver 412 to communicate over slice X with dAPP X in LN 441.

Item 401 is shipped to the grocery store where item 401 harvests ambient energy and wirelessly transmits its 5GID and GTIN. Transceiver 411 wirelessly detects the 5GID and the GTIN transmission from item 401. Transceiver 411 applies a rule set to check the format, frequency, and other characteristics of the transmission to authenticate the 5GID/GTIN transmission from item 401. In response to authentic detection, transceiver 411 calls its authorized API for slice X over its N1 to AMF 422 with the 5GID, GTIN, and metadata (like time, location, transceiver ID). Transceiver 411 also starts a routine to wirelessly detect the loss of the 5GID/GTIN transmission from item 401. AMF 422 transfers the API call for slice X to NEF 423 which serves slice X. NEF 423 transfers the API call to AF 424 which serves slice X. AF 424 translates the 5GID and/or GTIN through a data structure—possibly a data structure in UDSF 426—to yield the correct dAPP X in LN 441. AF 424 proposes an item transaction with the 5GID and GTIN from item 401 to dAPP X in LN 441 in response to the API call from NEF 423. In distributed ledger 431, LNs 441 and 451 execute dAPP X for the grocery store recycling campaign to generate a transaction result that indicates that item 401 has arrived at the grocery store. LNs 441 and 451 execute dAPP X to store the transaction result (item 401 arrives at the grocery store) in a blockchain format. For the blockchain format, LN nodes 441 and 451 store redundant data blocks in multiple geo-diverse locations and add hashes of previous data block to all new data blocks to generate an immutable data store.

Item 401 is purchased and transported away from the grocery store. Transceiver 411 wirelessly detects the loss of the 5GID and the GTIN transmission from item 401 when the transmission fades away. In response to the detection of item loss, transceiver 411 calls its authorized API over the N1 to AMF 422 with the 5GID and GTIN for slice X. AMF 422 transfers the API call for slice X to NEF 423. NEF 423 transfers the API call for slice X to AF 424. AF 424 translates the 5GID and/or GTIN through a data structure to yield the correct dAPP X in LN 441. AF 424 proposes an item transaction with the 5GID and GTIN from item 401 to dAPP X in LN 441 in response to the API call. In distributed ledger 431, LNs 441 and 451 execute dAPP X for the grocery store recycling campaign to generate a transaction result. The transaction result indicates that item 401 has left the grocery store. LNs 441 and 451 execute dAPP X to store the transaction result (item 401 leaves the grocery store) in the blockchain format.

Item 401 is used and the remaining plastic bottle is transported to the recycling center where the embedded circuitry again harvests ambient energy and wirelessly transmits the 5GID and GTIN. Transceiver 412 wirelessly detects the 5GID and the GTIN transmission from item 401. Transceiver 412 applies a rule set to check the format, frequency, and other characteristics of the transmission to authenticate the 5GID/GTIN transmission from item 401. In response to the authentic detection, transceiver 412 calls its authorized API over the N1 to AMF 422 with the 5GID and GTIN for slice X. Transceiver 412 also starts a routine to wirelessly detect the loss of the 5GID and the GTIN transmission from item 401. AMF 422 transfers the API call for slice X to NEF 423. NEF 423 transfers the API call for slice X to AF 424. AF 424 translates the 5GID and/or GTIN through a data structure to yield the correct dAPP X in LN 441 for the grocery store recycling campaign. AF 424 proposes an item transaction with the 5GID and GTIN from item 401 to dAPP X in LN 441 in response to the API call. In distributed ledger 431, LNs 441 and 451 execute dAPP X for the grocery store recycling campaign to generate a transaction result. The transaction result indicates that item 401 has arrived at the recycling center. LNs 441 and 451 execute dAPP X to store the transaction result (item 401 arrives at the recycling center) in the blockchain format.

Item 401 is recycled and the plastic is transported away from the recycling center. Transceiver 412 wirelessly detects the loss of the 5GID and the GTIN transmission from item 401. In response to the detection of item loss, transceiver 412 calls its authorized API over the N1 to AMF 422 with the 5GID and GTIN for slice X. AMF 422 transfers the API call for slice X to NEF 423. NEF 423 transfers the API call for slice X to AF 424. AF 424 translates the 5DID and/or GTIN into yield the correct dAPP X in LN 441. AF 424 proposes an item transaction with the 5GID and GTIN from item 401 to dAPP X in LN 441 in response to the API call. In distributed ledger 431, LNs 441 and 451 execute dAPP X for the grocery store recycling campaign to generate a transaction result. The transaction result indicates that item 401 has been recycled. LNs 441 and 451 execute dAPP X to store the transaction result (item 401 was recycled) in the blockchain format. The transaction result also indicates that a recycling credit is issued to the grocery store and that an index entry for the 5GID and GTIN to the blockchain data for item 401 was issued. LN 441 transfers the index entry to index 444. Index 444 forms a searchable 5GID/GTIN index to the corresponding immutable data in distributed ledgers 431-433 for multiple dAPPs, 5GIDs, GTINs, stores, centers, and the like.

Figure 5:
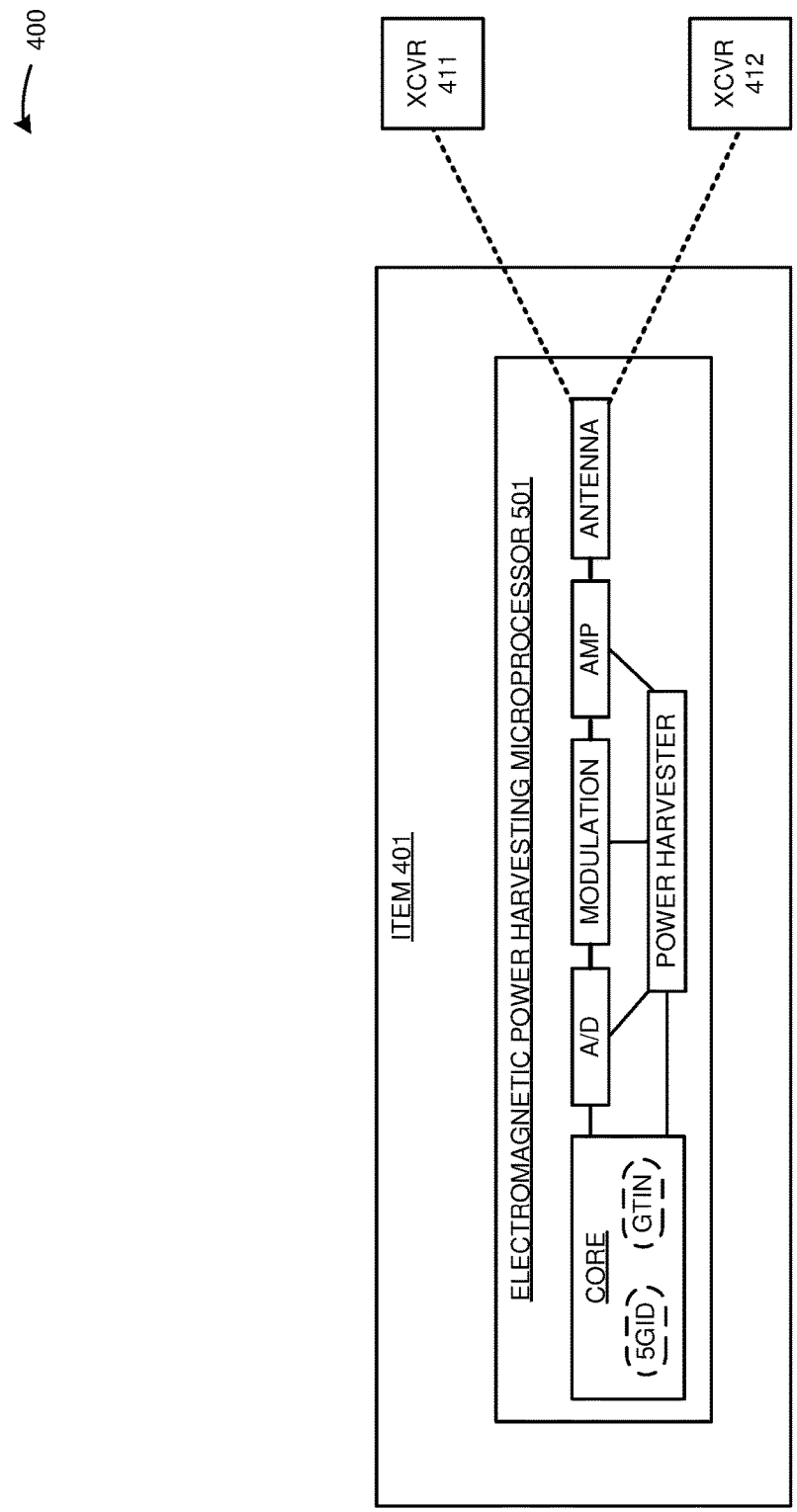
FIG. 5 illustrates an exemplary item in the 5G communication network.

FIG. 5 illustrates an exemplary item 401 in 5G communication network 400. Item 401 comprises an example of item 101, although item 101 may differ. Item 401 comprises electromagnetic power harvesting microprocessor 501. Electromagnetic power harvesting microprocessor 501 comprises a power harvester, processing core, antenna, amplifier, modulation, and analog-to-digital interface that are coupled over bus and power circuitry. The power harvester receives ambient wireless signals and stores the energy in capacitors or another medium. The core drives the analog-to-digital interface to broadcast the 5GID and GTIN for item 401 over the modulation, amplifier, and antenna. The antenna wirelessly transfers the 5GID and GTIN for item 401 to transceivers 411-412 when in range.

Figure 6:
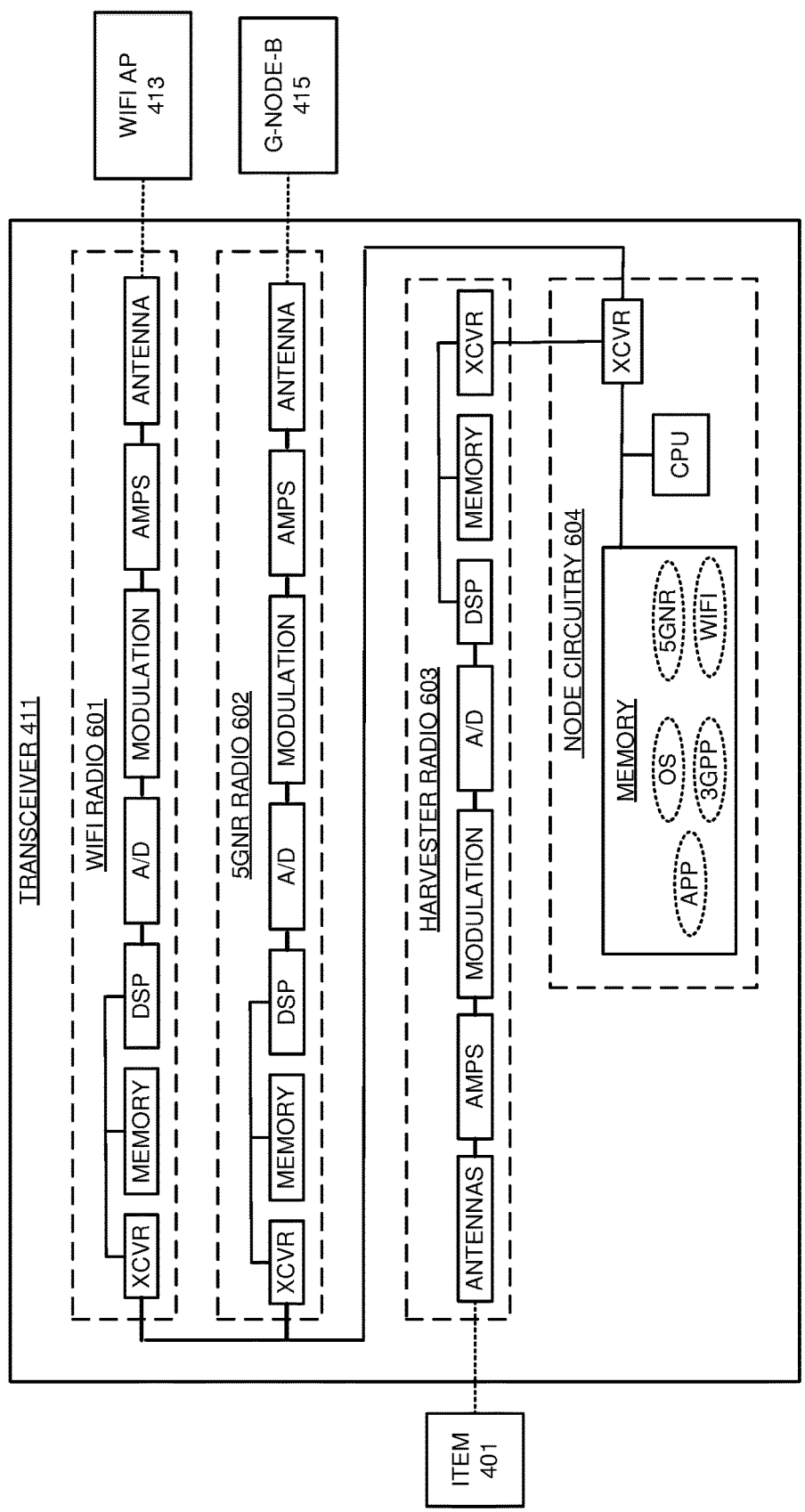
FIG. 6 illustrates an exemplary transceiver in the 5G communication network.

FIG. 6 illustrates exemplary transceiver 411 in 5G communication network 300. Transceiver 411 comprises an example of transceivers 111-113 and 412, although transceivers 111-113 and 412 may differ. Transceiver 411 comprises WIFI radio 601, 5GNR radio 602, harvester radio 603, and node circuitry 604. Radios 601-603 comprise antennas, amplifiers, filters, modulation, analog-to-digital interfaces, DSP, memory, and transceivers that are coupled to node circuitry 604 over bus circuitry. Node circuitry 604 comprises memory, CPU, and transceivers that are coupled over bus circuitry. The memory in node circuitry 604 stores an operating system, a data collection application (APP), and network applications for 3GPP, WIFI, and 5GNR. The antennas in WIFI radio 601 are wirelessly coupled to WIFI AP 413 over a WIFI link. The antennas in 5GNR radio 602 are wirelessly coupled to gNodeB 415 over a 5GNR link. The antennas in harvester radio 603 wirelessly receive data signals from item over an item broadcast frequency. The CPU in node circuitry 603 executes the operating system and data collection application to receive the 5GID and GTIN from item 401. The CPU in node circuitry 603 executes the operating system and network applications to transfer the 5GID, GTIN, and metadata for item 401 to slice X using the N1 API.

Figure 7:
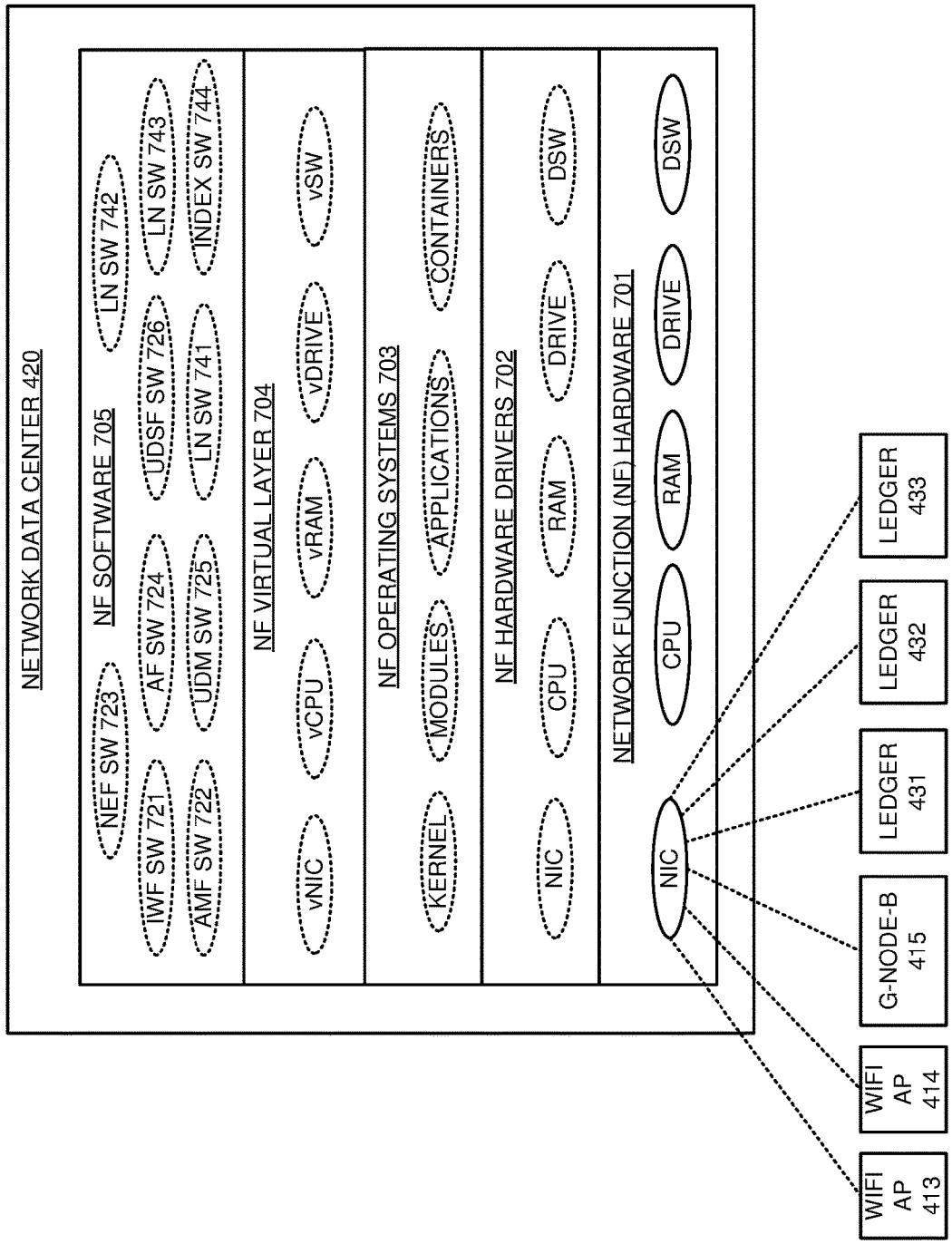
FIG. 7 illustrates an exemplary data center in the 5G communication network.

FIG. 7 illustrates an exemplary data center 420 in 5G communication network 400. Network data center 420 comprises an example of ledger gateway 114 and nodes 131, 134, and 137, although ledger gateway 114 and nodes 131, 134, and 137 may differ. Network data center 420 comprises Network Function (NF) hardware 701, NF hardware drivers 702, NF operating systems 703, NF virtual layer 704, and NF Software (SW) 705. NF hardware 701 comprises Network Interface Cards (NICs), CPU, RAM, Flash/Disk Drives (DRIVE), and Data Switches (DSW). NF hardware drivers 702 comprise software that is resident in the NIC, CPU, RAM, DRIVE, and DSW. NF operating systems 703 comprise kernels, modules, and applications that form containers for virtual layer and NF software execution. NF virtual layer 704 comprises vNIC, vCPU, vRAM, vDRIVE, and vSW. NF SW 705 comprises IWF SW 721, AMF SW 722, NEF SW 723, AF SW 724, UDM SW 725, UDSF SW 726, LN SW 741, LN SW 742, LN SW 743, and index SW 744. Other NF SW like Network Repository Function (NRF) SW are typically present but are omitted for clarity. Network data center 420 may be located at a single site or be distributed across multiple geographic locations. The NIC in NF hardware 701 are coupled to WIFI AP 413, WIFI AP 414, gNodeB 415, ledger 431, ledger 432, and ledger 433. NF hardware 701 executes NF hardware drivers 702, NF operating systems 703, NF virtual layer 704, and NF SW 705 to form and operate IWF 421, AMF 422, NEF 423, AF 424, UDM 425, UDSF 426, LNs 441-443, and index 444.

Figure 8:
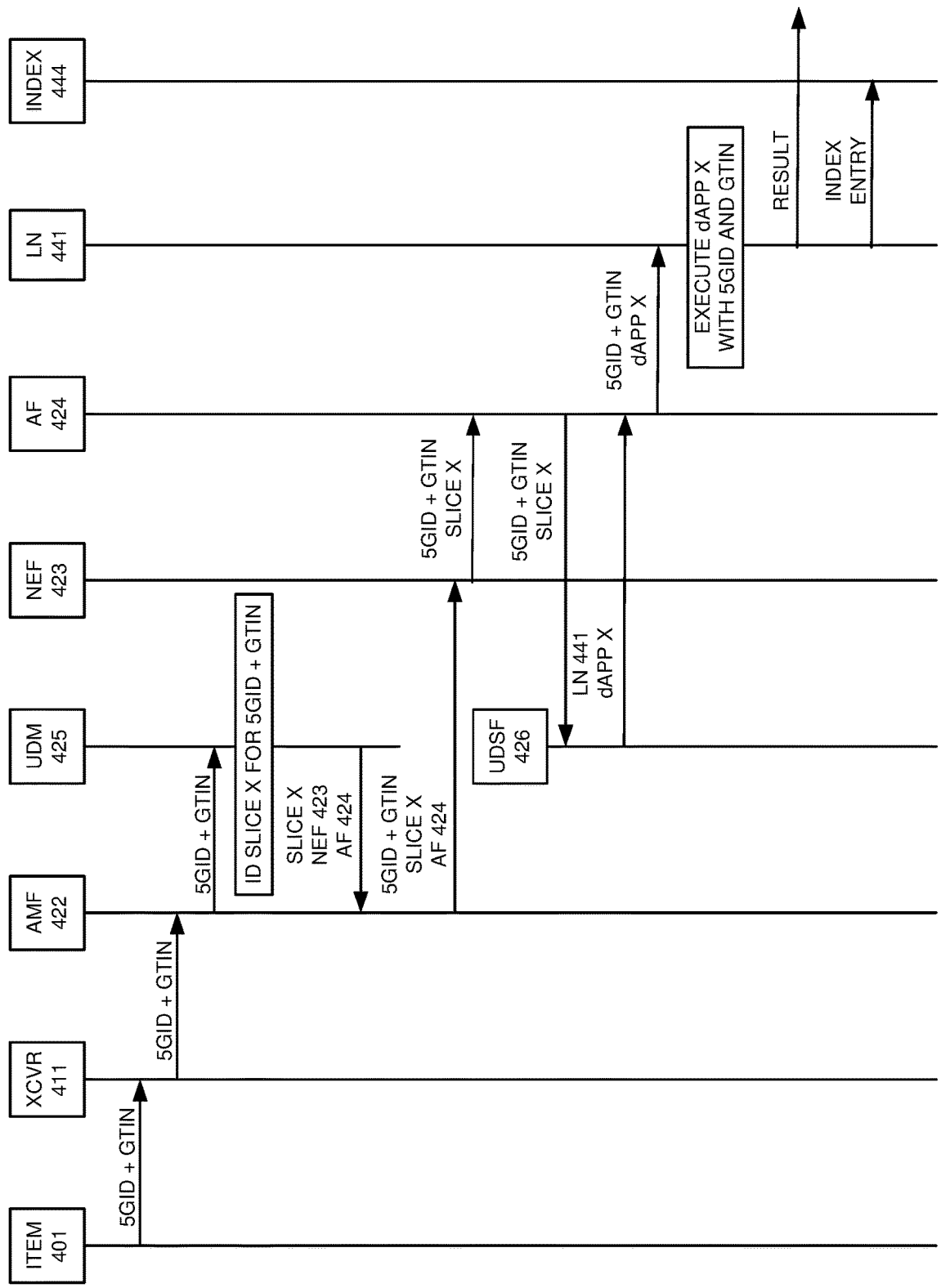
FIG. 8 illustrates an exemplary operation of the 5G communication network to track the item that wirelessly transfers the 5GID and the GTIN.

FIG. 8 illustrates an exemplary operation of 5G communication network 400 to track item 401 that wirelessly transfers the 5GID and the GTIN. The operation may vary in other examples. Item 401 wirelessly transmits its 5GID and GTIN. Transceiver 411 wirelessly detects the 5GID and the GTIN transmission from item 401. Transceiver 411 calls its API for slice X over its N1 to AMF 422 with the 5GID, GTIN, and metadata (like time, location, transceiver ID). To handle the API call, AMF 422 accesses UDM 425 with the 5GID and/or GTIN for item 401 to identify the slice X, NEF 423, and AF 424 for the 5GID and GTIN. AMF 422 transfers the API call for slice X to NEF 423 for delivery to AF 424. NEF 423 transfers the API call for slice X to AF 424. AF 424 accesses UDSF 426 with the 5GID and/or GTIN for slice X. UDSF 426 translates the 5GID and/or GTIN for slice X to yield dAPP X in LN 441. AF 424 proposes an item transaction with the 5GID and GTIN from item 401 to dAPP X in LN 441 in response to the API call from NEF 423 and the data from UDSF 426.

LN 441 executes dAPP X for the grocery store recycling campaign to generate a transaction result that indicates that item 401 has arrived at the grocery store. LN 441 executes dAPP X to store the transaction result (item 401 arrives at the grocery store) in the blockchain format. The dAPP X may also generate an index entry for index 444 that correlates the 5GID and GTIN with the related data in the blockchain in LN 441.

The wireless data network circuitry described above comprises computer hardware and software that form special-purpose circuitry to track items that wirelessly transfer their 5GIDs and GTINs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose circuitry to track items that wirelessly transfer their 5GIDs and GTINs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication system to track an item that wirelessly transfers a Fifth Generation Identifier (5GID) and a Global Trade Item Number (GTIN), the method comprising:
   one or more transceivers wirelessly detecting the 5GID and the GTIN, and in response, transferring messages indicating their detection of the 5GID and the GTIN to a ledger gateway;
   the ledger gateway receiving the messages indicating the 5GID and the GTIN detection, and in response, selecting a distributed application in a distributed ledger node based on at least one of the 5GID and the GTIN and proposing an item-tracking transaction with the 5GID and the GTIN to the selected distributed application in the distributed ledger node; and
   the distributed ledger node executing the distributed application, and in response, executing the proposed item-tracking transaction with the 5GID and the GTIN, generating an item-tracking result based on the proposed item-tracking transaction, and storing the item-tracking result in a blockchain format.

2. The method of claim 1 wherein the one or more transceivers wirelessly detecting the 5GID and the GTIN comprises detecting wireless signals from an ambient electromagnetic power harvesting microprocessor coupled to the item.

3. The method of claim 1 wherein the ledger gateway selecting the distributed application in the distributed ledger node based on the at least one of the 5GID and the GTIN comprises transferring the at least one of the 5GID and the GTIN to a Unified Data Management (UDM) and receiving a response from the UDM that indicates the distributed application in the distributed ledger node.

4. The method of claim 1 wherein the ledger gateway selecting the distributed application in the distributed ledger node based on the at least one of the 5GID and the GTIN comprises transferring the at least one of the 5GID and the GTIN to an Unstructured Data Storage Function (UDSF) and receiving a response from the UDSF that indicates the distributed application in the distributed ledger node.

5. The method of claim 1 wherein the ledger gateway selecting the distributed application in the distributed ledger node based on the at least one of the 5GID and the GTIN comprises selecting a wireless network slice that serves the distributed application in the distributed ledger node based on the at least one of the 5GID and the GTIN.

6. The method of claim 1 wherein the distributed ledger node generating and storing the item-tracking result comprises generating and storing shipping data that characterizes an arrival of the item at a geographic location.

7. The method of claim 1 wherein the distributed ledger node generating and storing the item-tracking result comprises generating and storing shipping data that characterizes a departure of the item from a geographic location.

8. The method of claim 1 wherein the distributed ledger node generating and storing the item-tracking result comprises generating and storing recycling data that characterizes an item recycling at a recycling center.

9. The method of claim 1 wherein the distributed ledger node generating and storing the item-tracking result comprises generating and storing a recycling credit for the item.

10. The method of claim 1 wherein the distributed ledger node generating the item-tracking result comprises generating an index entry to the stored item-tracking result for at least one of the 5GID and the GTIN.

11. A wireless communication system to track an item that wirelessly transfers a Fifth Generation Identifier (5GID) and a Global Trade Item Number (GTIN), the wireless communication system comprising:
one or more transceivers configured to wirelessly detect the 5GID and the GTIN, and in response, transfer messages indicating their detection of the 5GID and the GTIN to a ledger gateway;
the ledger gateway configured to receive the messages indicating the 5GID and the GTIN detection, and in response, select a distributed application in a distributed ledger node based on at least one of the 5GID and the GTIN and propose an item-tracking transaction with the 5GID and the GTIN to the selected distributed application in the distributed ledger node; and
the distributed ledger node configured to execute the distributed application, and in response, execute the proposed item-tracking transaction with the 5GID and the GTIN, generate an item-tracking result based on the proposed item-tracking transaction, and store the item-tracking result in a blockchain format.

12. The wireless communication system of claim 11 wherein the one or more transceivers are configured to detect wireless signals from an ambient electromagnetic power harvesting microprocessor coupled to the item to wirelessly detect the 5GID and the GTIN.

13. The wireless communication system of claim 11 wherein the ledger gateway is configured to transfer the at least one of the 5GID and the GTIN to a Unified Data Management (UDM) and receive a response from the UDM that indicates the distributed application in the distributed ledger node to select the distributed application in the distributed ledger node based on the at least one of the 5GID and the GTIN.

14. The wireless communication system of claim 11 wherein the ledger gateway is configured to transfer the at least one of the 5GID and the GTIN to an Unstructured Data Storage Function (UDSF) and receive a response from the UDSF that indicates the distributed application in the distributed ledger node to select the distributed application in the distributed ledger node based on the at least one of the 5GID and the GTIN.

15. The wireless communication system of claim 11 wherein the ledger gateway is configured to select a wireless network slice that serves the distributed application in the distributed ledger node based on the at least one of the 5GID and the GTIN to select the distributed application in the distributed ledger node based on the at least one of the 5GID and the GTIN.

16. The wireless communication system of claim 11 wherein the distributed ledger node is configured to generate and store shipping data that characterizes an arrival of the item at a geographic location to generate and store the item-tracking result.

17. The wireless communication system of claim 11 wherein the distributed ledger node is configured to generate and store shipping data that characterizes a departure of the item from a geographic location to generate and store the item-tracking result.

18. The wireless communication system of claim 11 wherein the distributed ledger node is configured to generate and store recycling data that characterizes item recycling redemption at a recycling center to generate and store the item-tracking result.

19. The wireless communication system of claim 11 wherein the distributed ledger node is configured to generate and store a recycling credit for the item to generate and store the item-tracking result.

20. The wireless communication system of claim 11 wherein the distributed ledger node is configured to generate an index entry to the stored item-tracking result for at least one of the 5GID and the GTIN to generate the item-tracking result.

* * * * *